United States Patent [19]
Axelrod

[11] Patent Number: 5,941,197
[45] Date of Patent: Aug. 24, 1999

[54] CARROT-BASED DOG CHEW

[75] Inventor: Glen S. Axelrod, Mahwah, N.J.

[73] Assignee: T.F.H. Publications, Inc., Neptune City, N.J.

[21] Appl. No.: 08/784,834

[22] Filed: Jan. 17, 1997

[51] Int. Cl.[6] .................................................. A01K 29/00
[52] U.S. Cl. ........................... 119/710; 426/512; 426/635
[58] Field of Search .................................. 119/709, 710; 426/512, 515, 635

[56] References Cited

U.S. PATENT DOCUMENTS

| | | | |
|---|---|---|---|
| D. 326,004 | 5/1992 | Rodriguez | 119/709 X |
| 3,821,446 | 6/1974 | Estey et al. | |
| 3,899,607 | 8/1975 | Miller et al. | |
| 4,076,846 | 2/1978 | Nakatsuka et al. | 426/512 X |
| 4,171,383 | 10/1979 | Chwalek et al. | |
| 4,310,558 | 1/1982 | Nahm, Jr. | 426/98 |
| 4,315,034 | 2/1982 | Levinson et al. | 426/104 |
| 4,735,808 | 4/1988 | Scaglione et al. | 426/62 |
| 4,784,860 | 11/1988 | Christensen et al. | 426/46 |
| 4,800,099 | 1/1989 | Gellman et al. | 426/641 |
| 4,892,748 | 1/1990 | Andersen et al. | 426/635 |
| 5,059,441 | 10/1991 | Bunick et al. | 426/515 |
| 5,240,720 | 8/1993 | Axelrod | 426/512 X |
| 5,419,283 | 5/1995 | Leo | 119/709 |
| 5,476,069 | 12/1995 | Axelrod | 119/709 |

*Primary Examiner*—Robert P. Swiatek
*Attorney, Agent, or Firm*—Hayes, Soloway, Hennessey, Grossman & Hage, P.C.

[57] ABSTRACT

A chew toy having a substantial component of carrot matter wherein such carrot matter, in dried and powdered or granulation form, is melted as it is injection molded. The process provides a chew toy with a consistency and chewability preferred by most dogs that is not attainable by known prior art baking or compression molding techniques.

12 Claims, No Drawings

CARROT-BASED DOG CHEW

BACKGROUND OF THE INVENTION

1. Field of the Invention

The present invention relates generally to dog chews, and more particularly, pertains to a nutritional dog chew based upon carrot matter.

2. Description of Related Art

Most dogs enjoy chewing on various items, and many are especially attracted to animal bones and animal-derived chew toys. However, bones and many animal-derived chew toys can pose a hazard to a dog in that any splinters or large pieces that are swallowed may become impaled or may otherwise obstruct the digestive tract. Moreover, the nutritional content of some of the processed dog chews, may not correspond to a particular dog's requirements. While various vegetable derived products are available to address such nutritional concerns, the chewability of such products does not conform to the chew characteristics desired in dog chews. The material is either not hard enough to serve as a dog chew or is extremely hard and dense to the point it is brittle and is therefore quickly and easily shattered by a large dog.

It is therefore desirable to provide a dog chew that has the chewing characteristics normally associated with chew toys, but providing a nutritional bone not found in indigestible plastic dog chews and in traditional meat/chicken-based dog chews.

SUMMARY OF THE INVENTION

The present invention provides a dog chew with a substantial component of carrot matter that overcomes the above-described disadvantages associated with prior art dog chews. The dog chew of the present invention has a consistency preferred by most dogs, and if shattered or splintered will tend to be digested and not cause intestinal blockage. Moreover, such dog chew is easily digestible, supplies nutrients to the dog and is composed completely of natural ingredients.

These advantageous characteristics are achieved by first comminuting carrot matter to small particles, bringing the comminuted particles to a desired moisture content, adding casein and gelatin, and then injecting the mixture in a liquefied state at a raised pressure into an injection mold. The molded form is then allowed to cool in the injection mold until it hardens.

In the course of subjecting the comminuted matter to melting temperatures, the material becomes sterilized. Such sterilization serves to interrupt any decaying process that may be in progress, and thereby alleviates the potential for the dog chew to emit a foul odor. Furthermore, sterilization is achieved without baking the molded material so as to yield a very chewable product with a consistency and texture preferred by most dogs. By molding the carrot-based mixture under a raised pressure, a substantially more cohesive product is formed than is possible using a baking process.

These and other features and advantages of the present invention will become apparent from the following detailed description of a preferred embodiment.

DETAILED DESCRIPTION OF A PREFERRED EMBODIMENT

The carrot-based dog chew of the present invention may be prepared as follows:

Dried carrot matter is comminuted into small particles not exceeding 0.25–0.50" across their largest dimension. Up to about 31% by weight of casein, up to about 30% by weight of water and up to about 4% by weight of gelatin may then be added to the carrot particle mixture to facilitate molding and to adjust the chewability of the ultimate product. Various attractants such as chicken or liver and/or certain nutrients such as vitamins may additionally be added to the particle mixture. The carrot matter includes up to about 4% by weight of ash.

The particle mixture is then injected into a conventional injection molding machine having a barrel temperature of about 250–400° F. and a molding pressure of about 1000–2500 psi. The heat serves to sterilize the mixture while the commensurate liquefication of the particle mixture ensures that a relatively homogeneous mixture of carrot matter, casein, gelatin, and any additives results. Homogeneity is most desirable as clumps of high concentrations of certain vitamins for example could be deleterious to the dog's health.

After the particle mixture in the mold has been molded, it is cooled sufficiently to cause the molded form to re-solidify into a desired shape, such as a bone, to thereby allow it to be ejected or extracted from the mold. Finally, the product is allowed to dry in a drying room over the course of about a week, while its moisture content is adjusted to about 13–14% by weight. It is not necessary to package the dog chew made in accordance with my present invention in moisture-proof packaging.

It has been found that dogs find the resulting dog chew especially attractive, presumably by virtue of its chewability and consistency. As the dog chews on the product, small slivers thereof become dislodged at which point the dog gains the benefit of any of the nutritional components contained therein. The consistency of the resulting dog chew is such that it takes most dogs about 30 minutes to a day to consume depending upon the particular dog, thereby providing a cost savings to the dog owner as compared to typical soft or small dog treats.

Chewing the hard molded dog chew made in accordance with the present invention serves to massage a dog's teeth and gums thereby inhibiting the formation of plaque. Additionally, because a dog satisfies its craving for food by chewing such dog chew, obesity in the dog is also inhibited.

While a particular form of the invention has been illustrated and described, it will also be apparent to those skilled in the art that various modifications can be made without departing from the spirit and scope of the invention as set forth by the appended claims.

What is claimed is:

1. A dog chew comprising injection molded carrot matter, casein and gelatin.

2. The dog chew of claim 1 additionally comprising an attractant.

3. The dog chew of claim 1, wherein said carrot matter is no larger than 0.25–0.50" across its largest dimension, wherein said casein is present up to 31% by weight, and wherein gelatin is present at about 4% by weight.

4. The dog chew of claim 1 further comprising nutrients.

5. The dog chew of claim 1, having the form of a bone.

6. A method of forming a dog chew, comprising the steps of:

drying carrot matter;

reducing said carrot matter to particles;

melting said dried particles;

injection molding said molten carrot matter to the desired shape of said dog chew;

removing the dried dog chew from the mold; and allowing said molding to harden.

7. The method of claim 6, wherein said carrot matter is reduced in size no larger than 0.25–0.50" in any dimension.

8. The method of claim 6, further comprising the step of adding casein and gelatin to the dried carrot matter before the melting and molding steps.

9. The method of claim 8, wherein said casein is added at up to approximately 31% by weight, and said gelatin is added by about 4% by weight, and the molding takes place at about 250–400° F. and at a pressure of about 1000–2500 psi.

10. The method of claim 9, wherein the moisture content of said molding is adjusted to about 4% by weight as it hardens.

11. The method of claim 10, wherein said matter is molded into the form of a bone.

12. The method of claim 9, wherein said molding is in the form of a bone.

\* \* \* \* \*